United States Patent
Sayama et al.

(10) Patent No.: US 9,616,520 B2
(45) Date of Patent: Apr. 11, 2017

(54) FRICTION STIR WELDING MEMBER

(75) Inventors: Mitsuru Sayama, Wako (JP); Tsutomu Kobayashi, Wako (JP); Tetsuya Miyahara, Wako (JP); Shosuke Ohhama, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 1118 days.

(21) Appl. No.: 13/442,832

(22) Filed: Apr. 9, 2012

(65) Prior Publication Data

US 2013/0078429 A1 Mar. 28, 2013

(30) Foreign Application Priority Data

Sep. 28, 2011 (JP) ................................ 2011-212241

(51) Int. Cl.
 *B23K 20/12* (2006.01)
 *B23K 101/18* (2006.01)
 *B23K 103/20* (2006.01)

(52) U.S. Cl.
 CPC ........ *B23K 20/122* (2013.01); *B23K 20/1265* (2013.01); *B23K 20/1225* (2013.01); *B23K 2201/18* (2013.01); *B23K 2203/20* (2013.01); *Y10T 428/24612* (2015.01)

(58) Field of Classification Search
 CPC .............. B23K 20/122; B23K 20/1265; B23K 2203/20; B23K 2201/18; B23K 20/1225; Y10T 428/24612
 USPC ....................................... 428/172; 228/112.1
 See application file for complete search history.

(56) References Cited

U.S. PATENT DOCUMENTS

| 2004/0057782 A1* | 3/2004 | Okamoto | B21K 25/005 403/271 |
| 2004/0079787 A1* | 4/2004 | Okamoto | B23K 20/125 228/112.1 |
| 2006/0231594 A1* | 10/2006 | Murakawa et al. | 228/112.1 |
| 2007/0280849 A1* | 12/2007 | Fukuchi et al. | 420/546 |
| 2010/0096438 A1* | 4/2010 | Sato et al. | 228/114 |

(Continued)

FOREIGN PATENT DOCUMENTS

| JP | 2004106037 A | * | 4/2004 |
| JP | 2006-239720 | | 9/2006 |

OTHER PUBLICATIONS

Machine Translation of JP 2004-106037A, Apr. 2004.*
Chinese Office Action for corresponding CN Application No. 201210202474.5, Oct. 8, 2015 (w/ English machine translation).

*Primary Examiner* — Prashant J Khatri
*Assistant Examiner* — Brian Handville
(74) *Attorney, Agent, or Firm* — Mori & Ward, LLP

(57) ABSTRACT

A friction stir welding member is formed by welding a second member to a first member in such a manner that a second member is stacked on a first member, a material property of the second member being different from a material property of the first member, a pin of a welding tool using a Friction Stir Welding technique is inserted into the second member, welding is started at one end of the second member, and the pin is pulled out at a welding terminal portion before the pin reaches the other end of the second member. A projection projecting toward the welding tool is provided integrally with the second member, the projection is formed so as to have a height that is higher than a length of the pin, and the projection is provided with the welding terminal portion.

9 Claims, 13 Drawing Sheets

(56) References Cited

U.S. PATENT DOCUMENTS

2010/0252171 A1* 10/2010 Feng et al. .................. 156/73.5
2011/0132970 A1* 6/2011 Nakagawa et al. ........ 228/112.1

* cited by examiner

BACKGROUND ART

FRICTION STIR WELDING MEMBER

CROSS-REFERENCE TO RELATED APPLICATIONS

The present application claims priority under 35 U.S.C. §119 to Japanese Patent Application No. 2011-212241, filed Sep. 28, 2011. The contents of this application are incorporated herein by reference in their entirety.

BACKGROUND OF THE INVENTION

Field of the Invention

The present invention relates to a friction stir welding member.

Discussion of the Background

There is a known Friction Stir Welding technique that is a technique for welding a steel plate to an aluminum plate (for example, see FIG. 2 in Japanese Unexamined Patent Application Publication No. 2006-239720).

Japanese Unexamined Patent Application Publication No. 2006-239720 is described with reference to the following figures.

FIG. 15 is a diagram illustrating the basic principle of the conventional art. In the Friction Stir Welding technique, a second member 202 with material properties different from those of a first member 201 is stacked thereon, and a pin 204 of a welding tool 203 which is rotated in a direction indicated by an arrow (1) is inserted into the second member 202. The welding tool 203 is relatively moved with the end of the pin 204 located at a height of h3 from the surface of the first member 201 that faces the second member.

Frictional heat is generated between the rotating pin 204 and the second member 202, and causes the second member 202 to be softened. The softened member 202 solidifies to become a welded portion 208, which serves to weld the second member 202 to the first member 201. Consequently, the second member 202 is welded to the first member 201, and a friction stir welding member 205 is obtained.

The length of the welded portion 208 may be set to be less than the length of the second member 202 in accordance with a design instruction, a work execution instruction, or the like. A cross-sectional view in this case is described in the following.

FIG. 16 is a cross-sectional view of a conventional friction stir welding member. A hole 206 is formed through the second member 202 after the pin 204 of the welding tool 203 is removed, and a surface 207 of the first member 201 that faces the second member is externally exposed. The first member 201 is a metal with a low voltage, the second member 202 is a metal with a high voltage, and thus if water comes into the hole 206 of the second member 202 and reaches the surface 207 of the first member 201 that faces the second member, a current flows from the second member 202 to the first member 201 via the water. Then the surface 207 that faces the second member corrodes due to the current.

As a way of preventing this corrosion, the hole 206 of the second member 202 may be blocked by a blocking member, however, this increases the production time because of the additional time required to attach the blocking member to the hole 206.

As another solution to this problem, the hole 206 may be filled with the second member 202 that is softened (softened material). In order to fill the hole 206 with the softened material, the pin 204 is pulled out from the softened material in FIG. 15, and a tool main body 209 is rotated as indicated by an arrow outline with a blank inside and is extruded to the softened material. By extruding the tool main body 209, the softened material is pressed by the tool main body 209. The pressed softened material flows into the hole which is then filled with the softened material.

SUMMARY OF THE INVENTION

According to one aspect of the present invention, a friction stir welding member is formed by welding a second member to a first member in such a manner that a second member is stacked on a first member, a material property of the second member being different from a material property of the first member, a pin of a welding tool using a Friction Stir Welding technique is inserted into the second member, welding is started at one end of the second member, and the pin is pulled out at a welding terminal portion before the pin reaches the other end of the second member. A projection projecting toward the welding tool is provided integrally with the second member, the projection is formed so as to have a height that is higher than a length of the pin, and the projection is provided with the welding terminal portion.

According to another aspect of the present invention, a friction stir welding member is formed by welding a second member to a first member in such a manner that a second member is stacked on a first member, a material property of the second member being different from a material property of the first member, a pin of a welding tool using a Friction Stir Welding technique is inserted into the second member, welding is started at one end of the second member, and the pin is pulled out at a welding terminal portion before the pin reaches the other end of the second member. A depression open toward the second member is provided integrally with the first member, part of the second member flows into the depression, and a portion of the second member that corresponds to the depression is provided with the welding terminal portion.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings.

DESCRIPTION OF THE EMBODIMENTS

Figure 1:
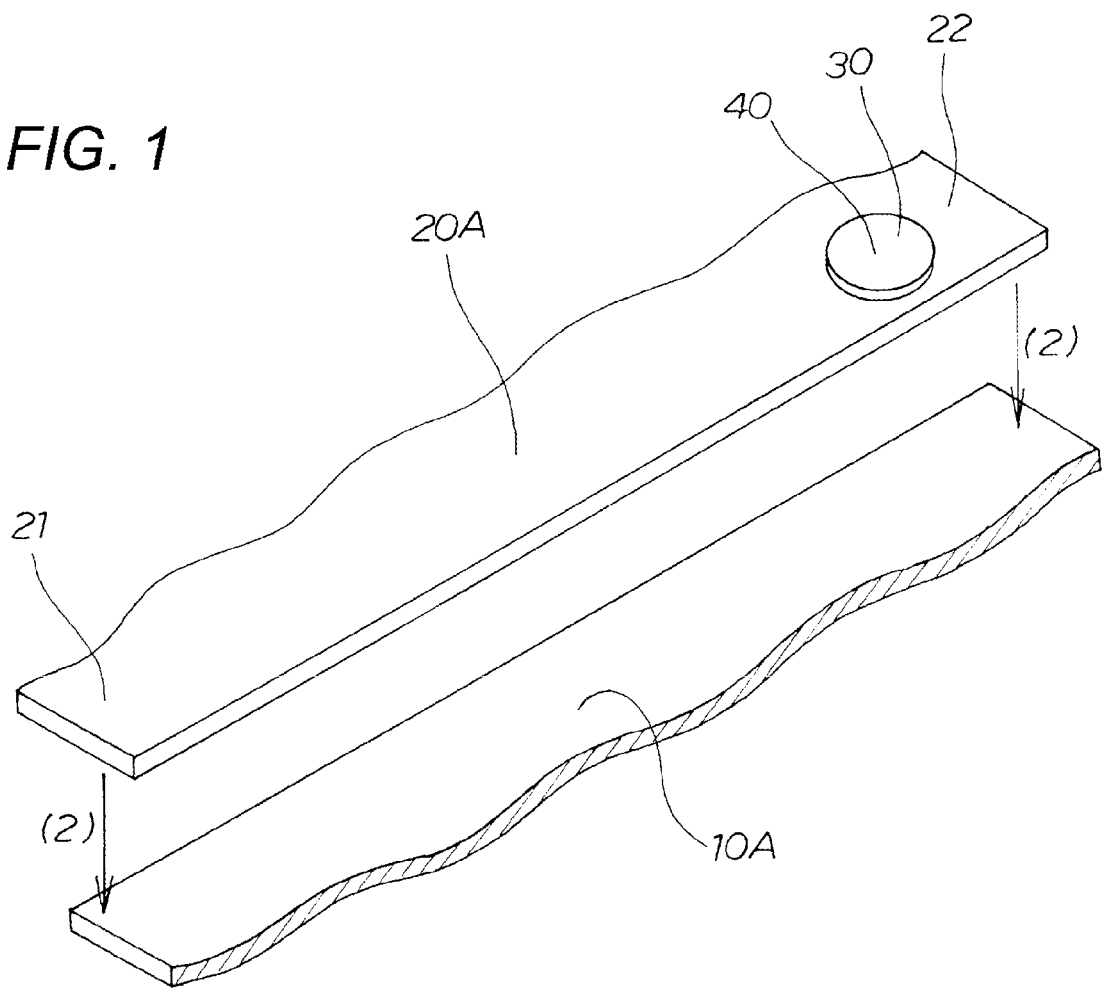
FIG. 1 is a perspective view of a first member and a second member according to an embodiment.

The embodiments will now be described with reference to the accompanying drawings, wherein like reference numerals designate corresponding or identical elements throughout the various drawings.

As illustrated in FIG. 1, the second member 20A is stacked on the first member 10A disposed underneath, as indicated by an arrow (2), and the second member 20A is positioned with respect to the first member 10A. The second member 20A is a member composed of a material different from that of the first member 10A. Next, the cross-sectional structures of the first member 10A and the second member 20A are described with reference to FIG. 2.

Figure 2:
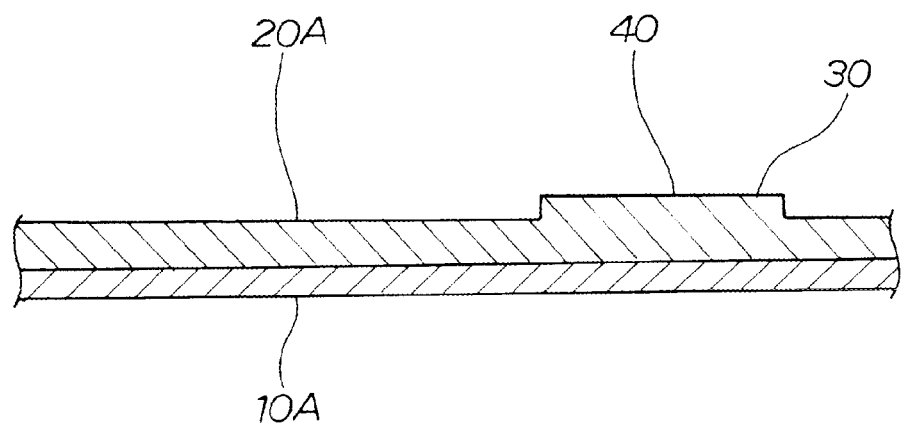
FIG. 2 is a cross-sectional view of the first member and the second member in FIG. 1.

As illustrated in FIG. 2, a second cylindrical projection 30 projecting toward the (below-described) welding tool is provided integrally with the second member 20A. This second projection 30 is formed so as to have a height that is higher than the (below-described) length of the (below-described) pin of the welding tool.

In addition, the second projection 30 is provided with a welding terminal portion 40 (details are described below). The welding terminal portion 40 is a portion which is used to pull out the pin where welding is started at one end of the second member 20A (reference symbol 21 in FIG. 1), and the pin is pulled out before the pin reaches the other end of the second member 20A (reference symbol 22 in FIG. 1).

The Friction Stir Welding technique that is applied to the above-mentioned first member 10A and second member 20A is described below.

Figure 3A:
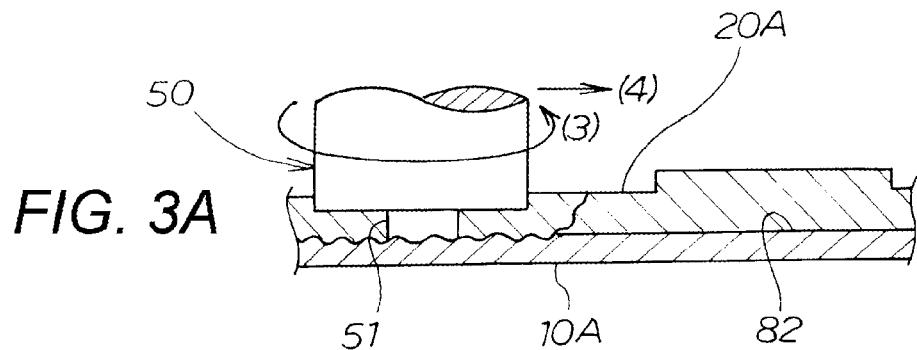
FIGS. 3A to 3D are cross-sectional views illustrating Friction Stir Welding technique that is applied to the first member and the second member in FIG. 2.

As illustrated in FIG. 3A, a pin 51 of a welding tool 50 which is rotated as indicated by an arrow (3) is inserted into the second member 20A. Because the rotating pin 51 comes into contact with the second member 20A, frictional heat is generated. The frictional heat causes the second member 20A around the pin 51 to be softened. The welding tool 50 is relatively moved as indicated by an arrow (4).

Figure 3B:
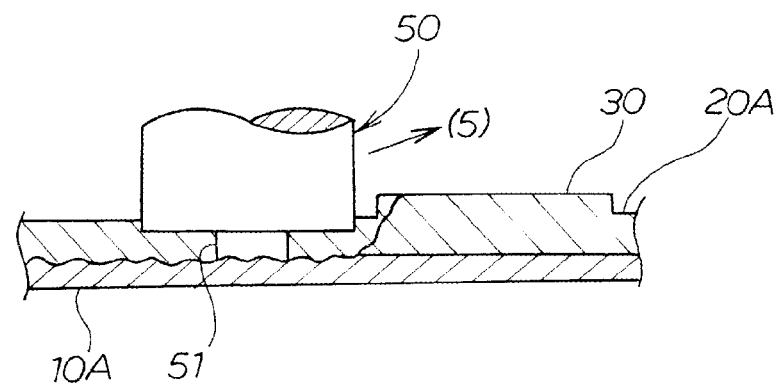

As illustrated in FIG. 3B, the welding tool 50 is further relatively moved as indicated by an arrow (5).

Figure 3C:
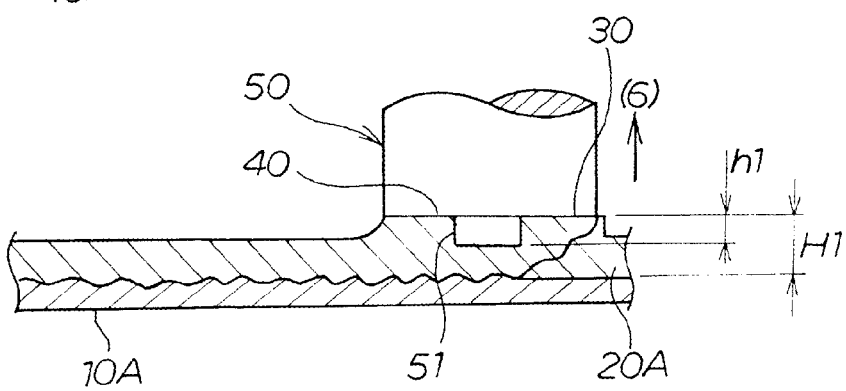

As illustrated in FIG. 3C, the welding tool 50 is moved to the welding terminal portion 40, and the pin 51 is pulled out as indicated by an arrow (6) at the welding terminal portion 40.

Figure 3D:
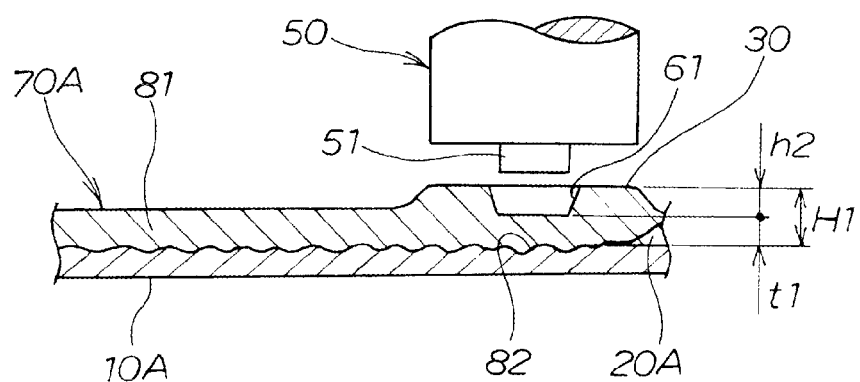

As illustrated in FIG. 3D, when the softened second member 20A solidifies, a pin-removed depression 61 having a volume corresponding to the volume of the pin 51 is formed in the second member 20A. Then the second member 20A is welded to the first member 10A, and a friction stir welding member 70A is obtained. Reference symbol 81 indicates a welded portion.

In FIG. 3C, the second projection 30 projecting toward the welding tool 50 is provided integrally with the second member 20A, and a height H1 of the second projection 30 is larger than a length h1 of the pin 51 of the welding tool 50. The second projection 30 is provided with the welding terminal portion 40, and the pin 51 is pulled out at the welding terminal portion 40 before the pin 51 reaches the other end of the second member 20A (the reference symbol 22 in FIG. 1). When the pin 51 is pulled out at the welding terminal portion 40 at the end of welding and the welding terminal portion 40 solidifies, as illustrated in FIG. 3D, the pin-removed depression 61 having a volume corresponding to the volume of the pin 51 is formed in the second member 20A. Because a depth h2 of the pin-removed depression 61 is smaller than the height H1 of the second projection 30, the second member 20A has a remaining thickness t1 which is obtained by subtracting the depth h2 of the pin-removed depression 61 from the height H1 of the second projection 30. In order to have the remaining thickness t1 of the second member 20A, the pin 51 is just pulled out from the welding terminal portion 40 at the end of welding, and thus no additional work is necessary and the production time for the work is reduced.

In addition, a surface 82 of the first member 10A that faces the second member 20A is not externally exposed due to the above-mentioned thickness t1. The first member 10A and the second member 20A are placed in a wet atmosphere, and thus corrosion of the first member 10A can be prevented even when the first member 10A is a metal with a low voltage and the second member 10A is a metal with a high voltage. Therefore, it is possible to provide the friction stir welding member 70A which can be produced in less time and can prevent the occurrence of the corrosion.

In the above description, the welding terminal portion 40 is allocated by disposing the second projection 30 in the second member 20A. There is another way to allocate a welding terminal portion to the second member. Another example in which a welding terminal portion can be allocated to the second member is described below.

Figure 4:
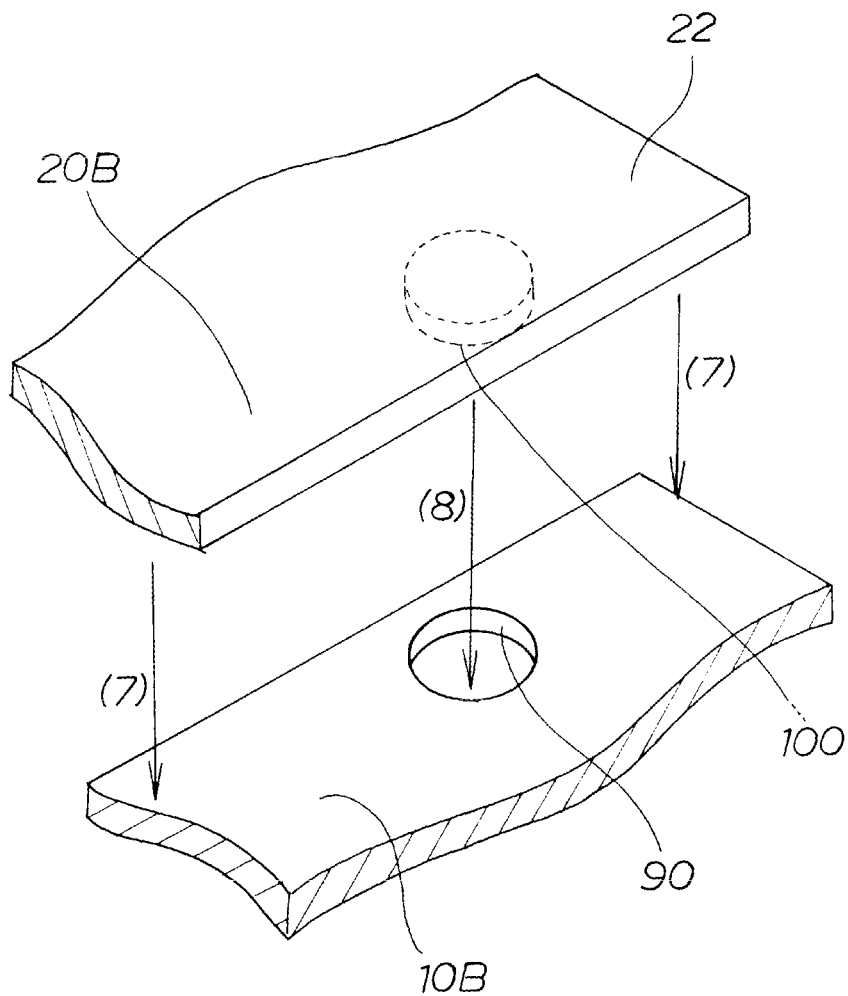
FIG. 4 is a perspective view illustrating a modification of the embodiment illustrated in FIG. 1.

In FIG. 4, the same reference symbols are used to designate the same or equivalent parts as in FIG. 1, and repeated description is omitted. The main modification is that the first member is provided with a hole, and the second member is provided with a projection projecting toward the first member.

The second member 20B is stacked on the first member 10B disposed underneath, as indicated by an arrow (7). Simultaneously, a second cylindrical projection 100 (details are described below) provided in the second member 20B is inserted into a first circular hole 90 (details are described below) provided in the first member 10B, as indicated by an arrow (8). Thus, the second member 20B is positioned with respect to the first member 10B.

The second member 20B is a member composed of a material different from that of the first member 10B. Next, the cross-sectional structures of the first member 10B and the second member 20B are described with reference to FIG. 5.

Figure 5:
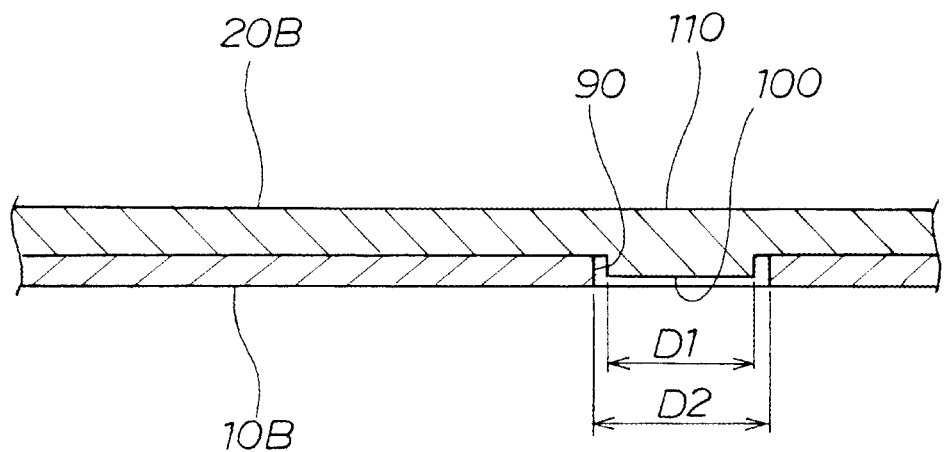
FIG. 5 is a cross-sectional view of the first member and the second member in FIG. 4.

As illustrated in FIG. 5, a second projection 100 projecting toward the first member 10B is provided integrally with the second member 20B. In addition, the surface of the second member 20B that faces the tool and corresponds to the second projection 100 is provided with a welding terminal portion 110.

On the other hand, the first member 10B is provided with a first hole 90 having an inner diameter D2 larger than an outer diameter D1 of the second projection 100.

The Friction Stir Welding technique that is applied to the above-mentioned first member 10B and second member 20B is described below.

Figure 6A:
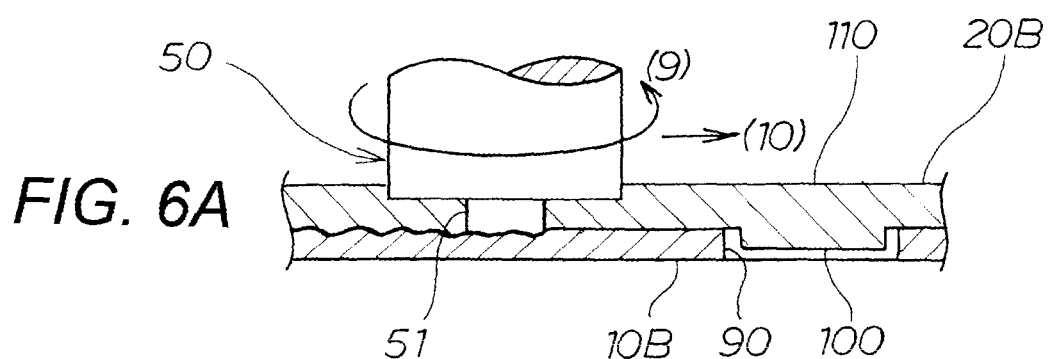
FIGS. 6A to 6C are cross-sectional views illustrating the Friction Stir Welding technique that is applied to the first member and the second member in FIG. 5.

As illustrated in FIG. 6A, the pin 51 of the welding tool 50 which is rotated as indicated by an arrow (9) is inserted into the second member 20B. Because the rotating pin 51 comes into contact with the second member 20B, frictional heat is generated. The frictional heat causes the second member 20B around the pin 51 to be softened. The welding tool 50 is relatively moved as indicated by an arrow (10).

Figure 6B:
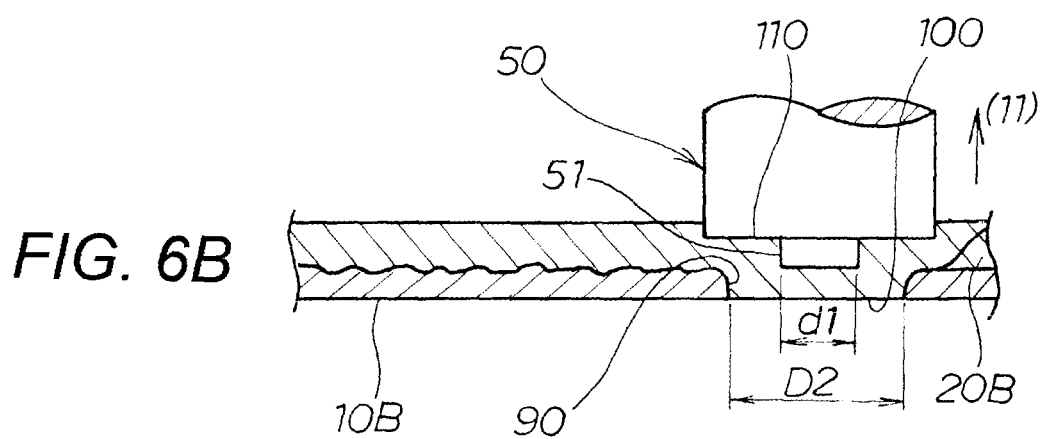

As illustrated in FIG. 6B, the welding tool 50 is moved up to the welding terminal portion 110, and the second projection 100 of the second member 20B which is stirred by the pin 51 fills the first hole 90. Next, the pin 51 is pulled out as indicated by an arrow (11) at the welding terminal portion 110.

Figure 6C:
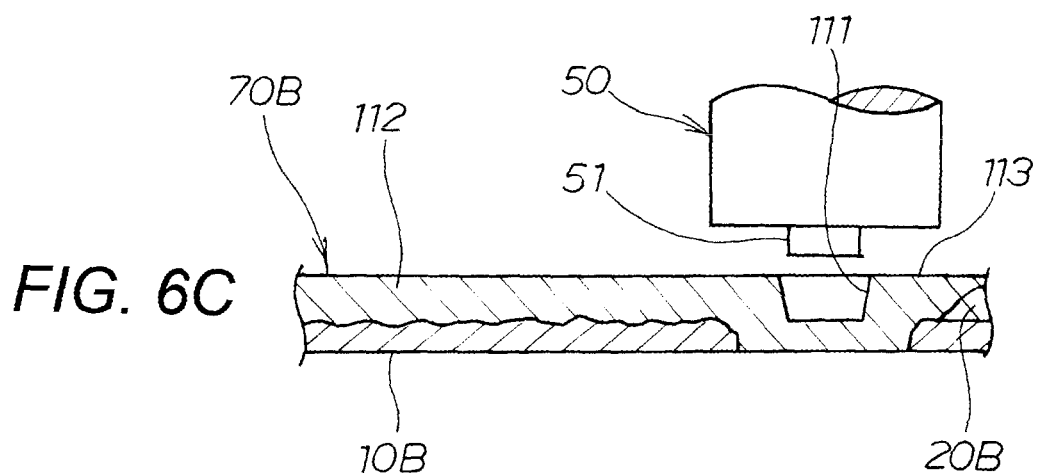

As illustrated in FIG. 6C, when the softened second member 20B solidifies, a pin-removed depression 111 having a volume corresponding to the volume of the pin 51 is formed in the second member 20B. Then the second member 20B is welded to the first member 10B, and a friction stir welding member 70B is obtained. Reference symbol 112 indicates a welded portion.

After the welding, a tool facing surface 113 of the second member 20B has the pin-removed depression 111 and is formed substantially flat. Even when the tool facing surface 113 is provided with the pin-removed depression 111, an additional member can be attached to the tool facing surface 113 because the periphery of the pin-removed depression 111 is substantially flat.

In FIG. 6B, D2>d1, where the inner diameter of the pin 51 is d1, and the outer diameter of the first hole 90 is D2. It is preferable that D2=1.6d1. When D2<1.6d1, the second member 20B fills the first hole 90 in an excessive amount. When D2>1.6d1, the second member 20B does not sufficiently fill the first hole 90. The dimension ratio of the above-mentioned inner diameter D2 of the first hole 90 with respect to the outer diameter d1 of the pin 51 is an example in the present embodiment, and the inner diameter and depth of the first hole, the outer diameter and length of the pin, and the like can be adjusted as needed so that the first hole may be sufficiently filled with the second member.

The above-described first member 10B is provided with the first hole 90. When the second projection 100 of the second member 20B fills the first hole 90, the second projection 100 can be seen from the outside. The second projection that fills the first hole has an improved external appearance if the second projection cannot be seen from the outside. Thus, a friction stir welding member having an improved external appearance is described below.

Figure 7:
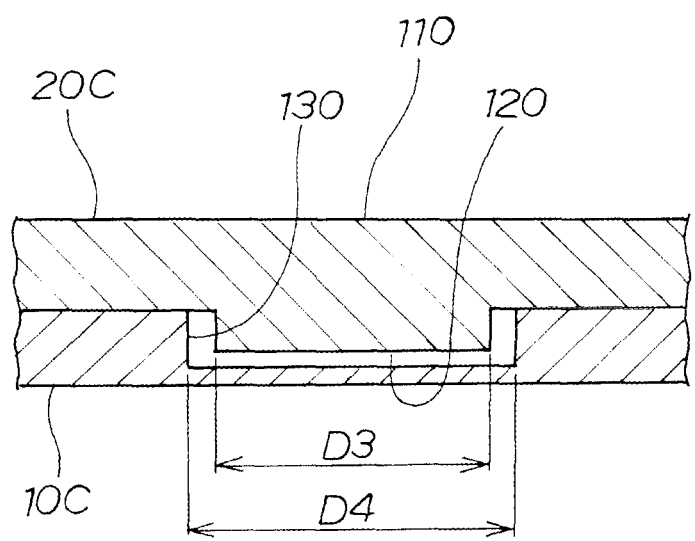
FIG. 7 is a cross-sectional view illustrating a modification of the embodiment illustrated in FIG. 5.

In FIG. 7, the same reference symbols are used to designate the same or equivalent parts as in FIG. 5, and repeated description is omitted. The main modification is that the first member is provided with a depression.

A second cylindrical projection 120 projecting toward the first member 100 is provided integrally with the second member 20C. The outer diameter of the second projection 120 is assumed to be D3.

On the other hand, a first depression 130 open toward the second member 20C is provided integrally with the first member 10C. The first depression 130 is a region into which the second projection 120 of the second member 20C which is stirred by the pin (the reference symbol 51 in FIGS. 6A to 6C) flows. An inner diameter D4 of the first depression 130 is larger than the outer diameter D3 of the second projection 120. The first depression 130 is circular in plan view.

In addition, the surface of the second member 20C that faces the tool and corresponds to the first depression 130 is provided with the welding terminal portion 110.

The Friction Stir Welding technique that is applied to the above-mentioned first member 100 and second member 20C is described below.

Figure 8A:
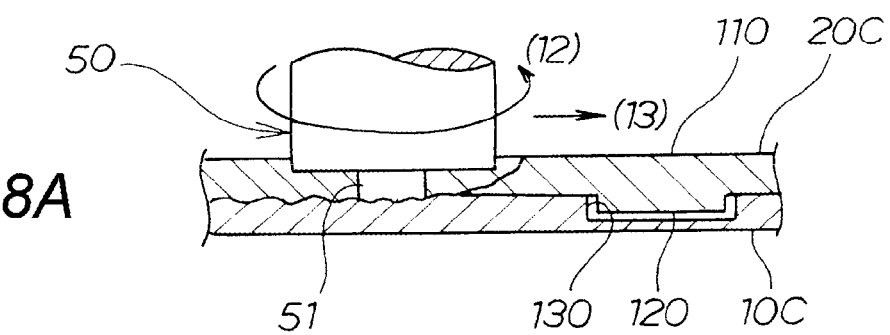
FIGS. 8A to 8C are cross-sectional views illustrating the Friction Stir Welding technique that is applied to the first member and the second member in FIG. 7.

As illustrated in FIG. 8A, the pin 51 of the welding tool 50 which is rotated as indicated by an arrow (12) is inserted into the second member 20C. Because the rotating pin 51 comes into contact with the second member 20C, frictional heat is generated. The frictional heat causes the second member 20C around the pin 51 to be softened. The welding tool 50 is relatively moved as indicated by an arrow (13).

Figure 8B:
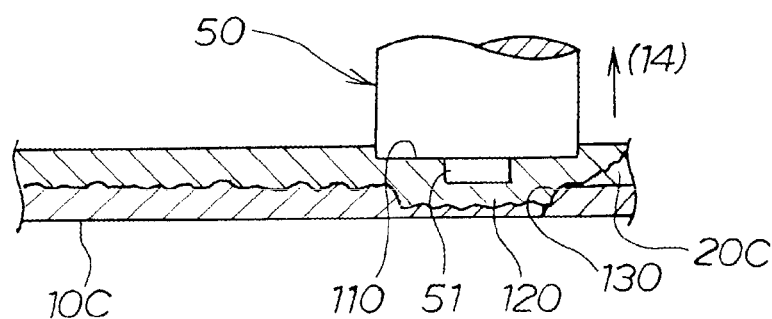

As illustrated in FIG. 8B, the welding tool 50 is moved up to the welding terminal portion 110, and the second projection portion 120 of the second member 20C which is stirred by the pin 51 fills the first depression 130. Next, the pin 51 is pulled out as indicated by an arrow (14) at the welding terminal portion 110.

Figure 8C:
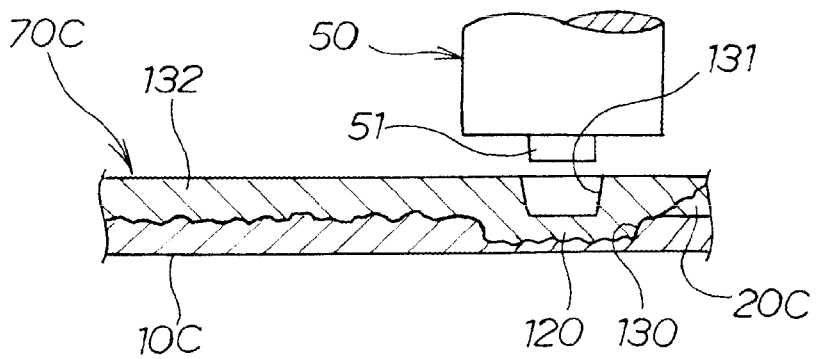

As illustrated in FIG. 8C, when the softened second member 20C solidifies, a pin-removed depression 131 having a volume corresponding to the volume of the pin 51 is formed in the second member 20C. Then the second member 20C is welded to the first member 100, and a friction stir welding member 70C is obtained. Reference symbol 132 indicates a welded portion.

In FIG. 8A, the first depression 130 open toward the second member 20C is provided integrally with the first member 100. The portion of the second member 200 that corresponds to the first depression 130 is provided with the welding terminal portion 110. When the pin 51 of the welding tool 50 reaches the welding terminal portion 110 at the end of welding, the material around the welding terminal portion 110 is softened due to the frictional heat generated between the pin 51 and the welding terminal portion 110. The softened material around the welding terminal portion 110 is stirred by the rotating pin 51 and flows into the first depression 130, and thus the material around the welding terminal portion 110 fills the first depression 130 as illustrated in FIG. 8B. The material around the welding terminal portion 110 which solidifies after the first depression 130 has been filled serves as a projecting portion that is welded to and occupies the first depression 130, thus the material around the welding terminal portion 110 occupies the first depression 130. Therefore, in addition to the second member 20C being welded to the first member 100, the material around the welding terminal portion 110 occupies the first depression 130, and thus the welding of the second member 20C to the first member 100 can be additionally reinforced.

Furthermore, the second projection 120 of the second member 20C fills the first depression 130 in FIG. 8C, and thus does not flow to the outside of the first member 10C. Because the second projection 120 does not flow to the outside, the external appearance of the friction stir welding member after the welding is improved. Consequently, the friction stir welding member 70C having an excellent external appearance can be provided.

The above-described first member 100 is provided with the first depression 130. By filling the first depression 130 with the second projection 120 of the second member 20C, the external appearance after the welding can be improved. It is preferable that the external appearance after the welding be improved and the processing cost for the friction stir welding member be reduced. Thus, an example is described in which the external appearance is improved, and the processing cost is reduced.

Figure 9:
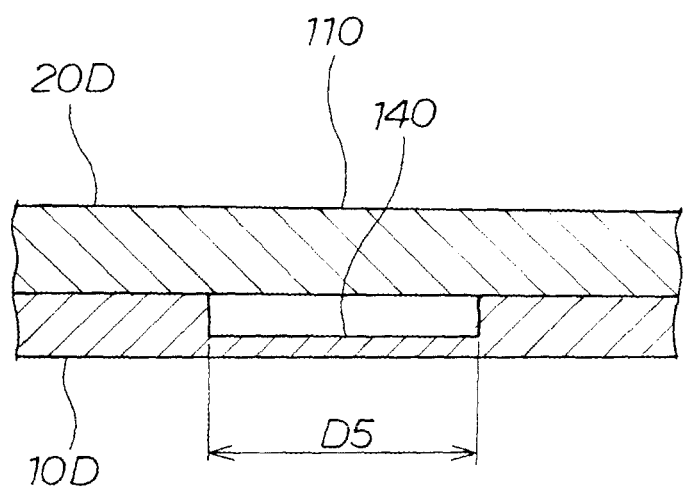
FIG. 9 is a cross-sectional view illustrating another modification of the embodiment illustrated in FIG. 5.

In FIG. 9, the same reference symbols are used to designate the same or equivalent parts as in FIG. 5, and repeated description is omitted. The main modification is that the first member is provided with a depression and the projection of the second member is removed.

A first depression 140 open toward a second member 20D is provided integrally with a first member 10D. The first depression 140 is a region into which part of the second member 20D which is stirred by the pin (the reference symbol 51 in FIGS. 6A to 6C) flows. The inner diameter of the first depression 140 is assumed to be D5. The first depression 140 is circular in plan view.

The second member 20D is a flat plate. In addition, the surface of the second member 20D that faces the tool and corresponds to the first depression 140 is provided with the welding terminal portion 110.

The Friction Stir Welding technique that is applied to the above-mentioned first member 10D and second member 20D is described below.

Figure 10A:
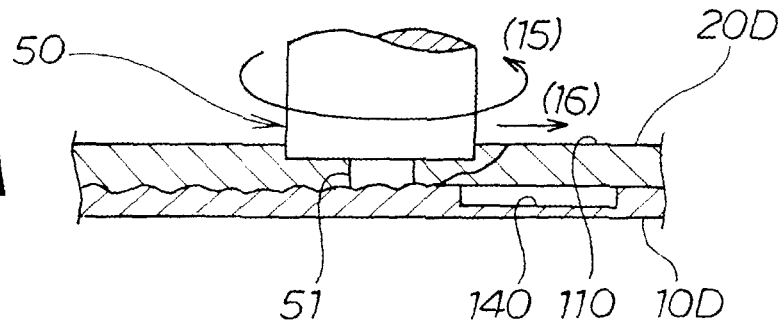
FIGS. 10A to 10C are cross-sectional views illustrating the Friction Stir Welding technique that is applied to the first member and the second member in FIG. 9.

As illustrated in FIG. 10A, the pin 51 of the welding tool 50 which is rotated as indicated by an arrow (15) is inserted into the second member 20D. Because the rotating pin 51 comes into contact with the second member 20D, frictional heat is generated. The frictional heat causes the second member 20D around the pin 51 to be softened. The welding tool 50 is relatively moved as indicated by an arrow (16).

Figure 10B:
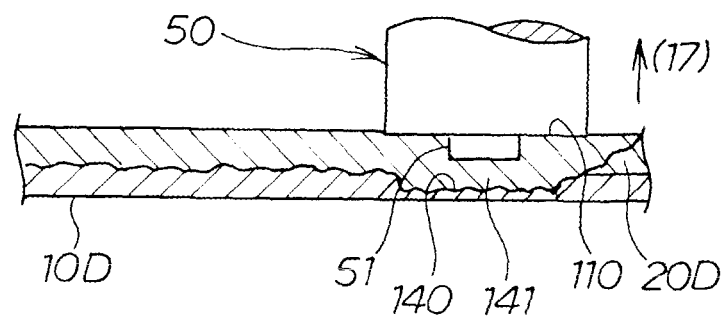

As illustrated in FIG. 10B, the welding tool 50 is moved up to the welding terminal portion 110, and a part 141 of the second member 20D which is stirred by the pin 51 fills the first depression 140. Next, the pin 51 is pulled out as indicated by an arrow (17) at the welding terminal portion 110.

Figure 10C:
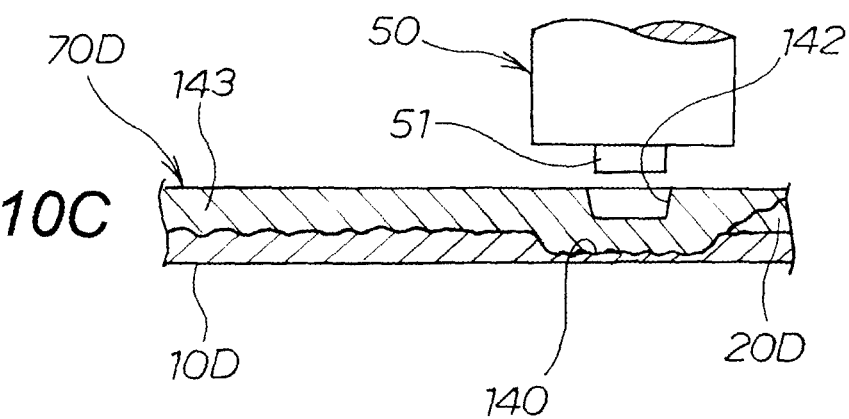

As illustrated in FIG. 10C, when the softened second member 20D solidifies, a pin-removed depression 142 having a volume corresponding to the volume of the pin 51 is formed in the second member 20D. Then the second member 20D is welded to the first member 10D, and a friction stir welding member 70D is obtained. Reference symbol 143 indicates a welded portion.

In FIG. 10A, the first member 10D is provided with the first depression 140, and no processing is performed on the second member 20D. Because only the first member 10D is processed, the processing cost for the friction stir welding member 70D can be reduced. In addition, the part 141 of the second member 20D is covered by the first depression 140, thus the external appearance is improved. Consequently, the friction stir welding member 70D with an improved external appearance and a reduced processing cost can be provided.

The above-described first member 10D is provided with the first depression 140. By filling the first depression 140 with the part 141 of the second member 20D, the external appearance after the welding can be improved and the processing cost can be reduced. With simple processing performed on the first member, the manufacturing cost of the first member can be further reduced. Thus, an example is described in which the manufacturing cost of the first member can be further reduced.

Figure 11:
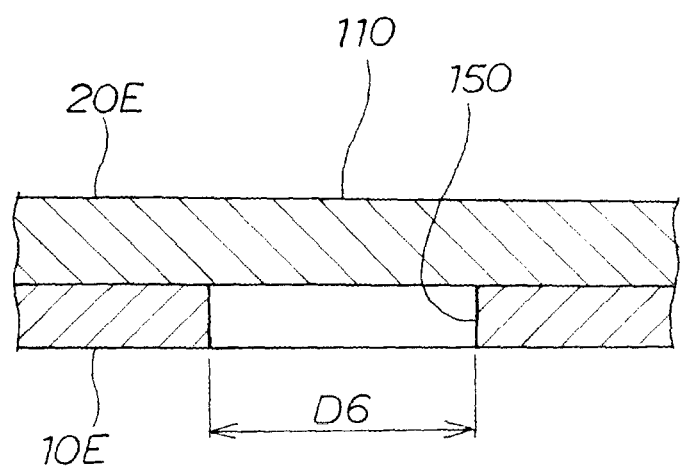
FIG. 11 is a cross-sectional view illustrating still another modification of the embodiment illustrated in FIG. 5.

In FIG. 11, the same reference symbols are used to designate the same or equivalent parts as in FIG. 5, and repeated description is omitted. The main modification is that the first member is provided with a hole.

A first hole 150 open to the second member 20E is disposed in the first member 10E. The inner diameter of a first hole 150 is D6. The first hole 150 is circular in plan view.

On the other hand, the second member 20E is a flat plate. In addition, the surface of the second member 20E that faces the tool and corresponds to the first hole 150 is provided with the welding terminal portion 110.

The Friction Stir Welding technique that is applied to the above-mentioned first member 10E and second member 20E is described below.

Figure 12A:
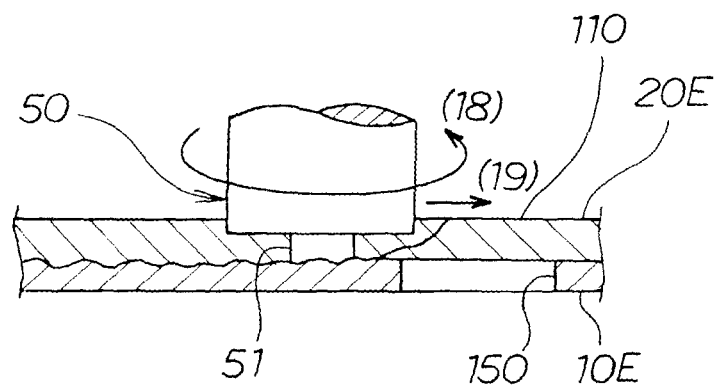
FIGS. 12A to 12C are cross-sectional views illustrating the Friction Stir Welding technique that is applied to the first member and the second member in FIG. 11.

As illustrated in FIG. 12A, the pin 51 of the welding tool 50 which is rotated as indicated by an arrow (18) is inserted into the second member 20E. Because the rotating pin 51 comes into contact with the second member 20E, frictional heat is generated. The frictional heat causes the second member 20E around the pin 51 to be softened. The welding tool 50 is relatively moved as indicated by an arrow (19).

Figure 12B:
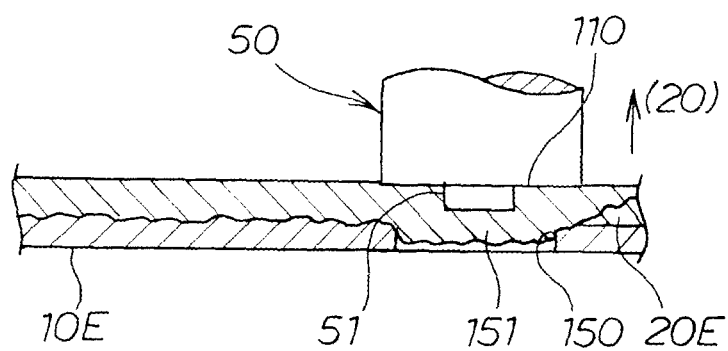

As illustrated in FIG. 12B, the welding tool 50 is moved up to the welding terminal portion 110, and a part 151 of the second member 20E which is stirred by the pin 51 fills the first hole 150. Next, the pin 51 is pulled out as indicated by an arrow (20) at the welding terminal portion 110.

Figure 12C:
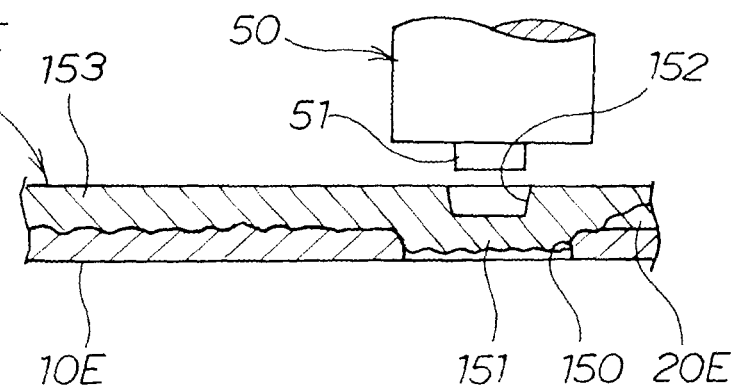

As illustrated in FIG. 12C, when the softened second member 20E solidifies, a pin-removed depression 152 having a volume corresponding to the volume of the pin 51 is formed in the second member 20E. Then the second member 20E is welded to the first member 10E, and a friction stir welding member 70E is obtained. Reference symbol 153 indicates a welded portion.

In FIG. 12A, the first member 10E is provided with the first hole 150, and no processing is performed on the second member 20E. Because the first hole 150 can be formed by just boring a hole through the first member 10E, the processing is much simpler. With simple processing, the processing cost is reduced, and thus the manufacturing cost of the first member can be further reduced.

The depression 140 is formed in the first member 10D in FIG. 9. If the processing time for the depression 140 can be reduced, the friction stir welding to the first member 10D can be quickly performed, and an increase in the capability of mass production of friction stir welding member can be expected. Thus, an example of the first member in an embodiment that is more suitable for the mass production is described below.

The first member in an embodiment that is more suitable for the mass production is described with reference to FIG. 13.

Figure 13:
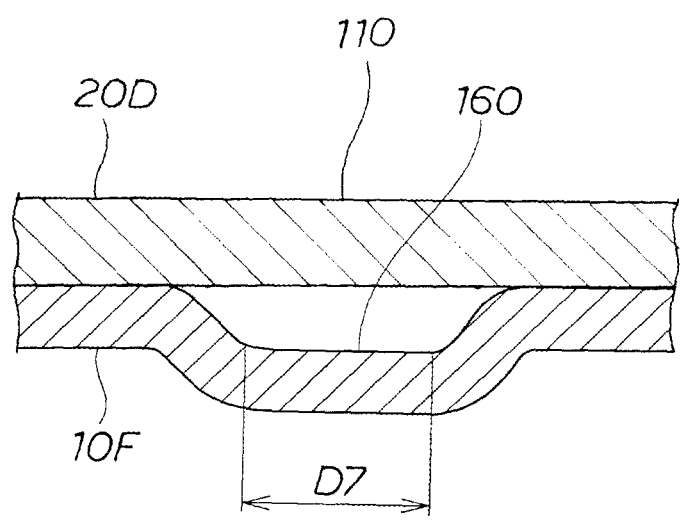
FIG. 13 is a cross-sectional view illustrating modification of the embodiment illustrated in FIG. 9.

In FIG. 13, the same reference symbols are used to designate the same or equivalent parts as in FIG. 9, and repeated description is omitted. The main modification of FIG. 9 is that stamping is performed on the first member so as to form a depression therein.

A first depression 160 open toward the second member 20D is provided integrally with a first member 10F. The first depression 160 is formed by stamping the first member 10F. In addition, the first depression 160 is a region into which part of the second member 20D which is stirred by the pin (the reference symbol 51 in FIGS. 6A to 6C) flows. The inner diameter of the base of the first depression 160 is assumed to be D7. The first depression 160 is circular in plan view.

The Friction Stir Welding technique that is applied to the above-mentioned first member 10F and second member 20D is described below.

Figure 14A:
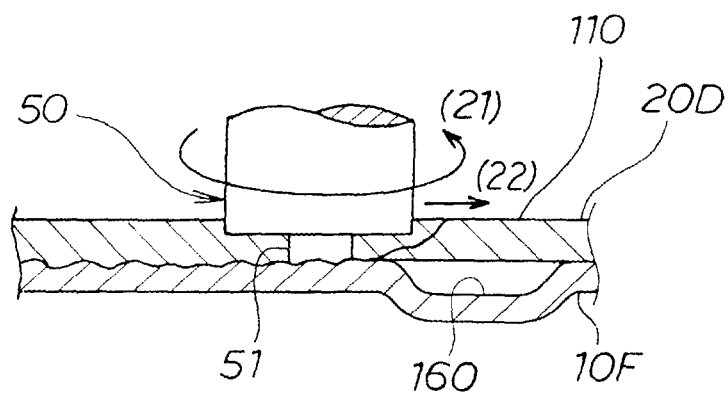
FIGS. 14A to 14C are cross-sectional views illustrating the Friction Stir Welding technique that is applied to the first member and the second member in FIG. 13.

As illustrated in FIG. 14A, the pin 51 of the welding tool 50 which is rotated as indicated by an arrow (21) is inserted into the second member 20D. Because the rotating pin 51 comes into contact with the second member 20D, frictional heat is generated. The frictional heat causes the second member 20D around the pin 51 to be softened. The welding tool 50 is relatively moved as indicated by an arrow (22).

Figure 14B:
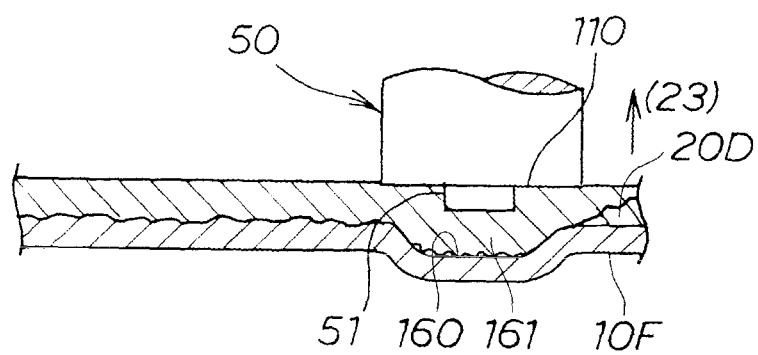

As illustrated in FIG. 14B, the welding tool 50 is moved up to the welding terminal portion 110, and a part 161 of the second member 20D which is stirred by the pin 51 fills the depression 160. Next, the pin 51 is pulled out as indicated by an arrow (23) at the welding terminal portion 110.

Figure 14C:
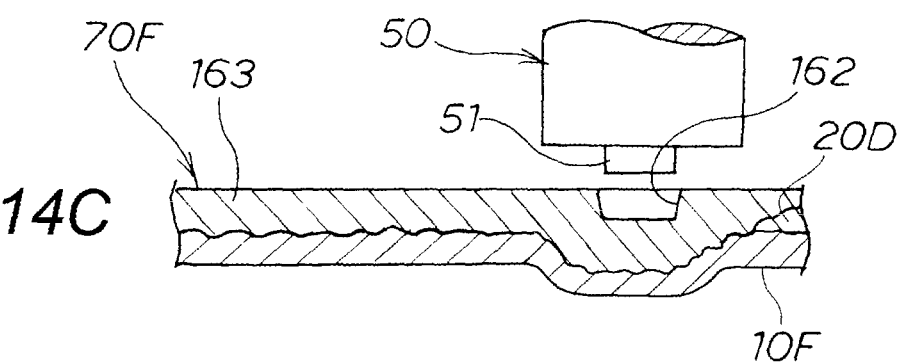
Figure 15:
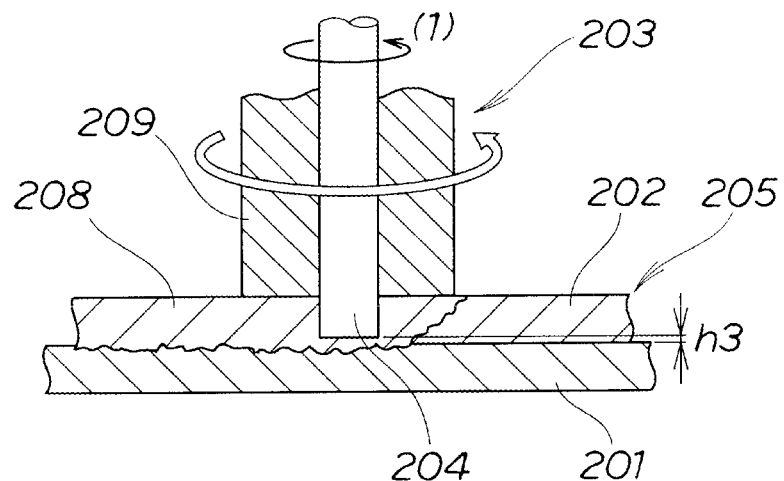
FIG. 15 is a cross-sectional view illustrating the basic principle of a conventional art.
Figure 16:
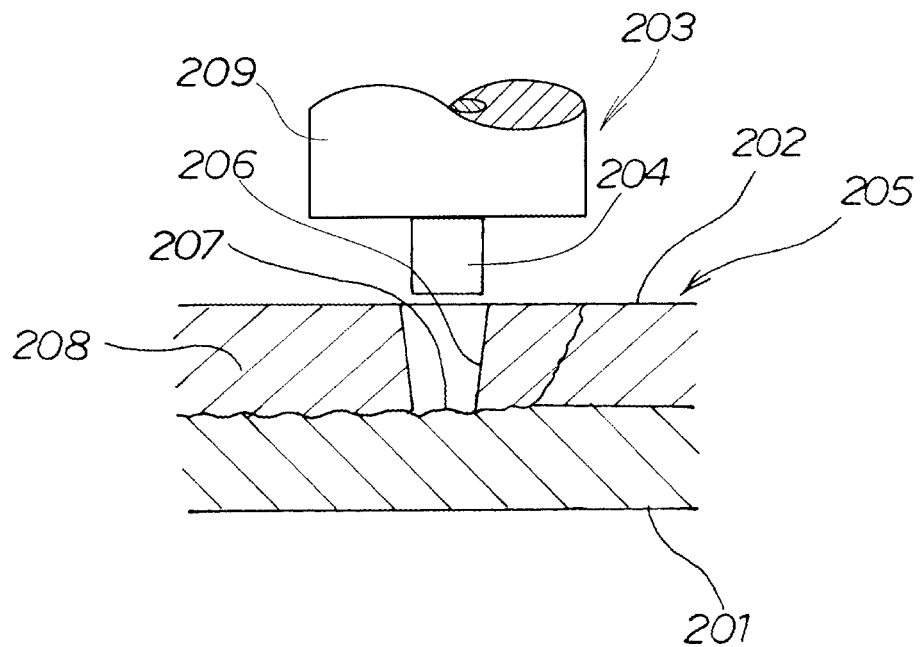
FIG. 16 is a cross-sectional view of a conventional friction stir welding member.

As illustrated in FIG. 14C, when the softened second member 20D solidifies, a pin-removed depression 162 having a volume corresponding to the volume of the pin 51 is formed in the second member 20D. Then the second member 20D is welded to the first member 10F, and a friction stir welding member 70F is obtained. Reference symbol 163 indicates a welded portion.

In FIG. 14A, stamping is performed on the first member 10F so as to form the depression 160. Because the stamping in general takes less time than machining, the first member 10F can be smoothly supplied to each friction stir welding process, and thus the friction stir welding to the first member 10F can be quickly performed. An increase in the capability of mass production of the friction stir welding member 70F can be expected by using the first member 10F.

A steel plate is preferred for the first member according to the embodiment, and an aluminum plate is preferred for the second member. A magnesium plate may be used as the second member instead of the aluminum plate.

In addition, the projection according to the embodiment has been assumed to be cylindrical in each embodiment, but may be prismatic or elliptical.

Furthermore, the depression according to the embodiment has been assumed to be circular in plan view, but may be prismatic or elliptical in plan view.

Obviously, numerous modifications and variations of the present invention are possible in light of the above teachings. It is therefore to be understood that within the scope of the appended claims, the invention may be practiced otherwise than as specifically described herein.

What is claimed is:

1. A friction stir welding member which is formed by welding a second member to a first member in such a manner that the second member is stacked on the first member, a material property of the second member being different from a material property of the first member, a pin of a welding tool using a Friction Stir Welding technique is inserted into the second member, welding is started at one end of the second member, the pin is advanced toward an other end of the second member during the welding, and the pin is pulled out at a welding terminal portion before the pin reaches the other end of the second member,
wherein a depressed portion open toward the second member and entirely disposed at an area at which the welding terminal portion is located is provided integrally with the first member prior to inserting the welding tool into the second member, part of the second member flows into the depressed portion, and a portion of the second member that corresponds to the depressed portion is provided with the welding terminal portion.

2. The friction stir welding member of claim 1,
wherein the advancing of the pin forms a welded portion that extends from the one end of the second member to the welding terminal portion.

3. The friction stir welding member of claim 1,
wherein the friction stir welding member is further formed by withdrawing the pin from an upper-most surface of the second member to form a depression, the periphery of the upper-most surface of the second member surrounding the depression being substantially flat and having a diameter that is smaller than a diameter of the depressed portion.

4. A friction stir welding member comprising:
a first member welded to a second member by inserting a pin of a welding tool into the second member and by using a Friction Stir Welding technique to form a welded portion, the welded portion extending from a one end of the second member toward an other end of the second member and formed by advancing the pin in a direction from the one end and toward the other end during welding; and
a terminal portion included in the welded portion, the terminal portion formed by a region of the second member which flowed into a depressed portion of the first member by the welding,
wherein the welded portion extends continuously between the one end and the other end, and the terminal portion is spaced from the other end such that the depressed portion is entirely disposed at an area at which the terminal portion is located.

5. The friction stir welding member of claim 4,
wherein an upper-most surface of the second member includes a depression formed by withdrawing the pin, the periphery of the upper-most surface of the second member surrounding the depression being substantially flat and having a diameter that is smaller than a diameter of the depressed portion.

6. The friction stir welding member of claim 1, wherein, prior to inserting the welding tool into the second member, the welding terminal portion includes a projection that projects toward and is surrounded by the depressed portion at the welding terminal portion.

7. The friction stir welding member of claim 4, wherein, prior to inserting the welding tool into the second member, the terminal portion includes a projection that projects toward and is surrounded by the depressed portion at the terminal portion.

8. The friction stir welding member of claim 1, wherein the friction stir welding member is further formed by withdrawing the pin from an upper-most surface of the second member to form a depression, the depression being disposed above a central portion of the depressed portion.

9. The friction stir welding member of claim 4, wherein the friction stir welding member is further formed by withdrawing the pin from an upper-most surface of the second member to form a depression, the depression being disposed above a central portion of the depressed portion.

* * * * *